United States Patent [19]

Wilbur et al.

[11] 4,268,248
[45] May 19, 1981

[54] PORTABLE PREHEATER

[75] Inventors: Robert L. Wilbur, Southwest Harbor; Carl R. Pearson, Manset, both of Me.

[73] Assignee: Lincoln A. Wilbur, Rangeley, Me.

[21] Appl. No.: 91,595

[22] Filed: Nov. 5, 1979

[51] Int. Cl.³ ............................ C21D 9/70; F24J 3/02; F02M 15/00; F24H 1/00
[52] U.S. Cl. .............................. 432/62; 123/142.5 R; 432/63; 432/222
[58] Field of Search ........................ 432/62, 63, 222; 123/142.5 R

[56] References Cited

U.S. PATENT DOCUMENTS

| | | | |
|---|---|---|---|
| 2,418,097 | 3/1947 | Ruff | 432/63 |
| 2,966,347 | 12/1960 | Wolffradt | 432/222 |
| 3,160,401 | 12/1964 | Wollner | 432/222 |
| 3,995,991 | 12/1976 | Wilkinson | 432/62 |
| 4,063,876 | 12/1977 | Schweiss | 432/222 |

Primary Examiner—John J. Camby

Attorney, Agent, or Firm—Daniel H. Kane, Jr.

[57] ABSTRACT

In a portable preheater of the type used for burning a fuel and air mixture generated from a pressurized gas cylinder and blower, and for delivering hot exhaust air for preheating, the improvements including a warming receptacle formed to support the fuel gas cylinder and define a substantially enclosed pathway around at least a portion of a cylinder supported in the receptacle and further including means for diverting and feeding back a minor portion of the hot exhaust air delivered by the engine preheater into the warming receptacle whereby the fuel gas cylinder is maintained at a temperature to permit continuous vaporization of the fuel at a desired rate. The novel combustion chamber arrangement for dynamically interpenetrating fuel stream and air flow, stationary turbine blade for helical diversion and further mixing, and retroreflective secondary burning, coact to afford long burning time at operative temperatures using small gas cylinders of the disposable type.

18 Claims, 5 Drawing Figures

PORTABLE PREHEATER

FIELD OF THE INVENTION

This invention relates to a new and improved portable engine preheater particularly suitable for preheating aircraft engines, diesel engines, and difficult to start gas engines in remote locations as occurs in the logging, construction, and fishing industries, but also applicable generally for portable heater applications such as thawing out frozen water pipes and drains.

BACKGROUND OF THE INVENTION

Aircraft engine design and the higher than normal temperature point required to vaporize aircraft engine fuel make it virtually impossible to fire up most single or twin aircraft engines in below freezing weather, without preheat. Most airports do not have a preheater system and rely on putting the plane in a hanger for an hour or so. Otherwise, the airport preheater is a large ground heater and connecting hose which frequently cannot provide enough heat to start the engine. The only "portable" engine preheaters available for carrying along on the plane are expensive and bulky, operated off a large camper type gas cylinder. The combination takes up all the room and weight allowance for baggage. Such available preheaters do not provide efficient heat, are time consuming to operate, and are inappropriate for other preheating applications such as for engines in remote locations as occurs in logging, construction, and fishing activities. Nor do such preheaters, because of their bulk, lend themselves to general portable heater applications such as thawing out frozen pipes and drains.

SUMMARY OF THE INVENTION

It is therefore an object of the present invention to provide a new and improved lightweight engine preheater which is truly "portable" and contained within a storage and carrying case for carrying on small planes and for use at remote sites.

Another object of the invention is to provide a portable engine preheater operable from small disposable type gas cylinders yet which can draw fuel from the small cylinder at a rate to supply ample hot exhaust air for engine preheating without freezing up the cylinder.

A further object of the invention is to provide a portable engine preheater operable from small pressurized gas cylinders which can still provide long burning time from a single cylinder and at sufficient temperature by efficient and complete combustion of the fuel vaporized from the cylinder.

In order to accomplish these results, the present invention contemplates providing a new and improved portable engine preheater of the type used for burning a fuel and air mixture generated from a pressurized gas cylinder and blower and for delivering hot exhaust air for preheating. According to one aspect of the invention, the preheater is provided with a warming receptacle formed to support the fuel gas cylinder and define a substantially enclosed pathway around at least a portion of a cylinder supported in the receptacle and further includes means for diverting and feeding back a minor portion of the hot exhaust air delivered by the engine preheater into the warming receptacle whereby the fuel gas cylinder is maintained at a temperature to permit continuous vaporization of the fuel at a desired rate.

According to another aspect of the invention, the new portable engine preheater is provided with improved structure and arrangement for generating and combusting a fuel and air mixture from the pressurized gas cylinder and blower including a nozzle and nozzle feed for generating a stream of vaporized or fragmented fuel gas from the pressurized gas cylinder; a shroud arrangement mounted co-axially around the nozzle and coupled to the blower for delivering a flow of mixing air around the nozzle and fuel gas stream; mixing vane means interposed in the air and fuel gas stream path for introducing turbulence and enhancing mixture of fuel and air; means for igniting the air and fuel mixture downstream from the mixing vanes; and an exhaust gas retroreflector mounted in the path of the ignited mixture for turning the flame back upon itself to enhance secondary burning and complete combustion of the fuel.

In a preferred embodiment of the invention, the fuel nozzle comprises an angled annular ring nozzle for generating an annular stream of fuel gas in a cone directed outwardly from the directional axis of flow. A feature and advantage of this arrangement is that the outwardly directed fuel gas stream encounters and mixes with the flow of air around the nozzle and fuel stream directed by the blower and shroud. In the preferred form the mixing vanes comprise stationary radial turbine vanes or blades for cicularly diverting and further mixing the intermingling fuel and air gas flow. The turbine vanes or blades, however, do not have to be stationary and could be rotatable. Furthermore, in the preferred embodiment a hollow conical shaped reflector is interposed in the ignited fuel gas stream for reflection of the flame back upon itself for secondary combustion of fuel constituents and complete burning. The unique combination of dynamically interpenetrating fuel stream and air flow, stationary or rotating turbine blades for helical diversion and further mixing, and retroreflective secondary burning, all in the novel combustion chamber arrangement of the present invention coact to afford long burning time at operative temperature for efficient and effective preheating using small gas cylinders of the disposable type.

The invention also contemplates that the elements of the engine preheater including the arrangement for generating and combusting a fuel gas and air mixture from a pressurized gas cylinder and a blower be operatively coupled together and housed within a lightweight and small volume carrying case. In this aspect of the invention the blower is mounted directly to the carrying case and the means for generating and combusting a fuel gas and air mixture is mounted to the blower and spaced from the walls of the carrying case to define a cooling space between the combustion chamber and the carrying and storage case. According to the invention, the blower shroud is configured to deliver a first flow of air into the fuel and air mixture generating and combusting chamber, and for delivering a second flow of air in the space between the combustion chamber and the walls of the case for cooling the carrying case and maintaining the case at a temperature so that it can be handled and stored safely.

Another feature and advantage of the present invention is that the elements of the preheater are constructed and arranged in the carrying case for synergistic intercoupling and efficient coaction. Thus, the portable engine preheater carrying case includes the warming receptacle for receiving and supporting a fuel gas cylinder, the receptacle formed with an inlet and an outlet and means for deflecting and delivering a minor portion of hot exhaust air to the warming receptacle inlet for warming a fuel gas cylinder supported in the receptacle. Furthermore, the blower inlet is in part coupled to the warming receptacle outlet for drawing the flow of warming air around the cylinder, whereby the cylinder is maintained at the temperature necessary to permit continuous vaporization of the fuel gas at the desired rate.

The present invention achieves the remarkable yield of 325 degrees exhaust output for some 45 minutes using a 14.1 ounce disposable propane cylinder, approaching 18,000 BTU output while a conventional burner drawing fuel at that rate from a small cylinder would freeze up the fuel cylinder in 4-6 minutes.

Other objects, features, and advantages of the present invention will become apparent in the following specification and accompanying drawings.

DESCRIPTION OF THE PREFERRED EMBODIMENT

Figure 1:
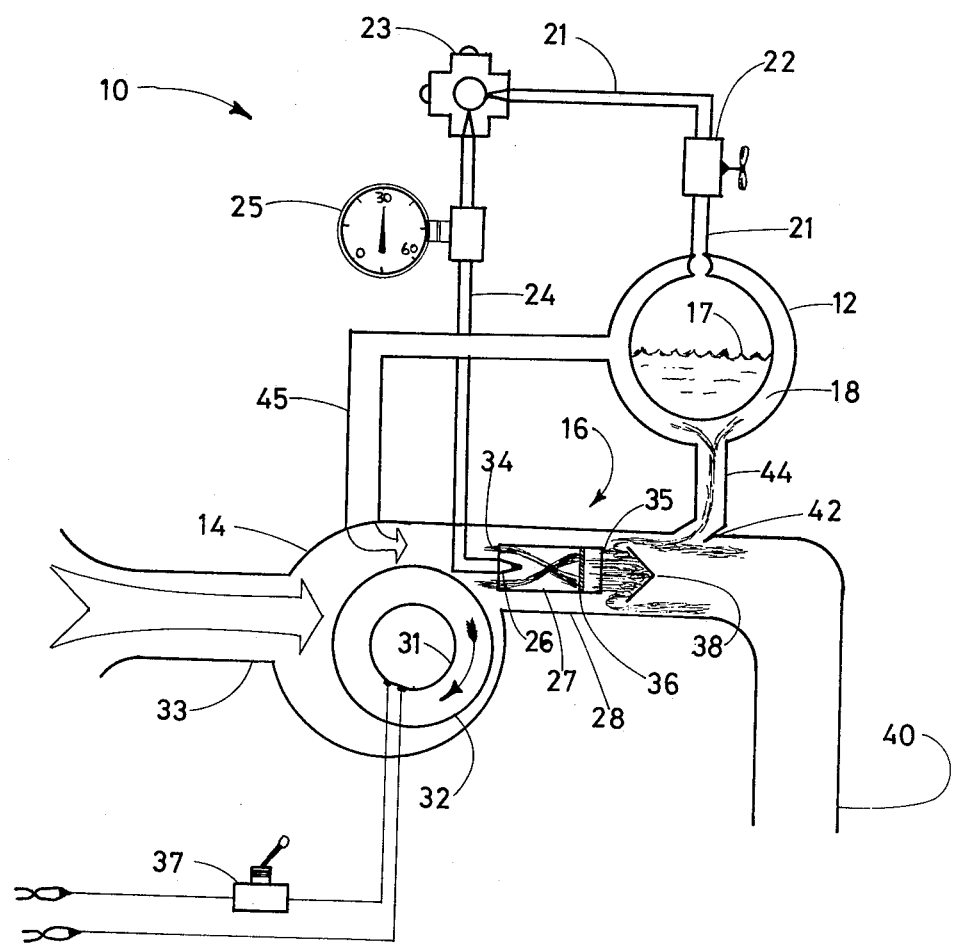
FIG. 1 is a diagrammatic flow chart or systems diagram showing the intercoupling and operation of the elements of the preheater in accordance with the present invention.

The principles of operation of the engine preheater according to the present invention are illustrated in the diagrammatic flow chart or systems diagram of FIG. 1. As shown in that Figure, the major elements of components of engine preheater 10 include the warming receptacle 12, blower 14, and air and fuel mixing and combustion chamber area 16.

The warming receptacle 12 defines an enclosed passageway 18 around at least a portion of a liquid propane or other pressurized gas cylinder 17 inserted in the receiving hole of the receptacle. Gas fuel vaporized from the cylinder 17 escapes through passageway 21 when the shut off valve 22 is manually opened continuing through to the pressure regulator 23. Whereas gas from the cylinder in line 21 varies in pressure from 50-120 P.S.I.G., pressure in the line 24 downstream from pressure regulator 23 is maintained in the range 20-40 P.S.I.G. and preferably 30 P.S.I.G. as indicated by the pressure guage 25.

The fuel gas in line 24, now under regulated pressure enters the mixing and combustion area 16 through nozzle 26 preferably an outwardly angled delivery annular ring nozzle. The nozzle 26 is coaxially centered within the cylindrical mixing chamber 27 and blower shroud 28 coupled to blower 14. The motor 31 and rotor 32 of blower 14 draw in environmental air through major inlet 33 providing a flow of air through an annular slit or ring of holes 34 into the mixing chamber and around the mixing chamber for further mixing with the ignited fuel and air mixture in the combustion area 35. Within the mixing chamber 27 downstream from the nozzle 26 and mixing air stream is interposed an array of mixing vanes 36, preferably a stationary turbine blade of radial vanes which circularly divert the fuel air mixture, creating turbulence which further effectively mixes the fuel and air prior to ignition just downstream from the vanes 36. The ignited fuel and air mixture is directed into the retroreflector 38 mounted in the shroud 28 to turn the flame back upon itself for secondary combustion of fuel constituents in the exhaust. In this preferred example, the retroreflector takes the form of a cone with the point oriented downstream thereby directing the concave surface or side of the cone into the exhaust stream, channeling the burning mixture back upon itself.

After deflection the hot exhaust air passes around the cone deflector into the primary conduit or duct 40 through which most of the hot exhaust air is delivered for preheating an aircraft engine or for other preheating purposes. In this example, approximately 95% of the exhaust air is delivered under pressure for preheating purposes. As shown in the diagram, a minor portion of the exhaust, for example 5% is diverted by deflector 42 into conduit 44 for delivery to the inlet of the warming receptacle 12 and the enclosed passageway 18 which it defines for maintaining the gas fuel cylinder 17 at a temperature above the vaporization point of the fuel.

According to the present invention, the engine preheater unit 10 is designed to burn small pressurized gas cylinders of the disposable type such as the small "Bernz-O-Matic" type gas cylinder. In order to provide hot exhaust air at a rate necessary for preheating purposes, the fuel gas in turn would ordinarily have to be vaporized and drawn off at a rate such that the temperature in the cylinder would drop rapidly to less than 40 degrees below zero at which point the fuel would no longer vaporize and the fuel supply is "frozen." The deflection and feedback of hot exhaust air by deflector 42 through duct 44 to the warming receptacle enclosure around the cylinder afforded by the present invention overcomes this problem, warming the gas cylinder and maintaining a temperature for rapid vaporization of the liquid fuel, in this case liquid propane. By this expedient, fuel can be drawn at a rate not ordinarily possible from a small pressurized cylinder of liquid propane sufficient to permit use of the small canister for engine preheating purposes not heretofore possible.

Furthermore, by means of the combustion chamber sequence including the nozzle, cylindrical curtain or co-axial stream of air surrounding the nozzle, mixing chamber mixing vanes, and secondary combustion retroreflector, the efficiency is so high that a single canister or small cylinder can provide 45 minutes of 325 degree exhaust air for engine preheating use. In the preferred form, the nozzle 26 is a 80 degree nozzle of the type used in oil burner furnaces and oil guns for delivering an 80 degree annular cone of fuel outwardly directed into the surrounding stream of air delivered by the blower into the mixing chamber 27 through annular slit 34. Mixing vanes 36 comprise a stationary turbine with radially directed angled blades or vanes that circularly divert the mixture, introduce turbulence, and cause further mixing. The turbine blade could alternatively be mounted for rotation in the air/fuel stream. The ignition occurs downstream from the vanes as hereafter described and the burning mixture is supplied by the blower with additional air for complete combustion through shroud 28 passing outside the mixing chamber 27.

It should be noted that the blower draws air for delivery through a primary air inlet 33. The blower housing however also includes a subsidiary inlet passageway 45 coupled to the warming receptacle 18 and forming an outlet for the warming receptacle. In this way, the blower is also coupled to draw the minor portion of hot exhaust air through the warming receptacle for warming the cylinder during evaporization of fuel.

The blower motor 31 is controlled by switch 37 in the line coupled to a power supply. Such a power supply would be, for example, a 12 volt storage battery of the kind which would be available with the engine at a remote site. The blower may be, for example, a low current drain 12 volt DC 100 CFM motor although a 12 V/24 V combination blower or 110 volt AC blower system could also be used.

Using the components described above for implementing the system of the present invention, the weight of the preheater is as low as 18 pounds, and 22 pounds with two full cylinders or canisters. The entire assembly can be housed in a compact carrying case of size 18"×8"×9" with room left for carrying up to three cylinders.

Figure 2:
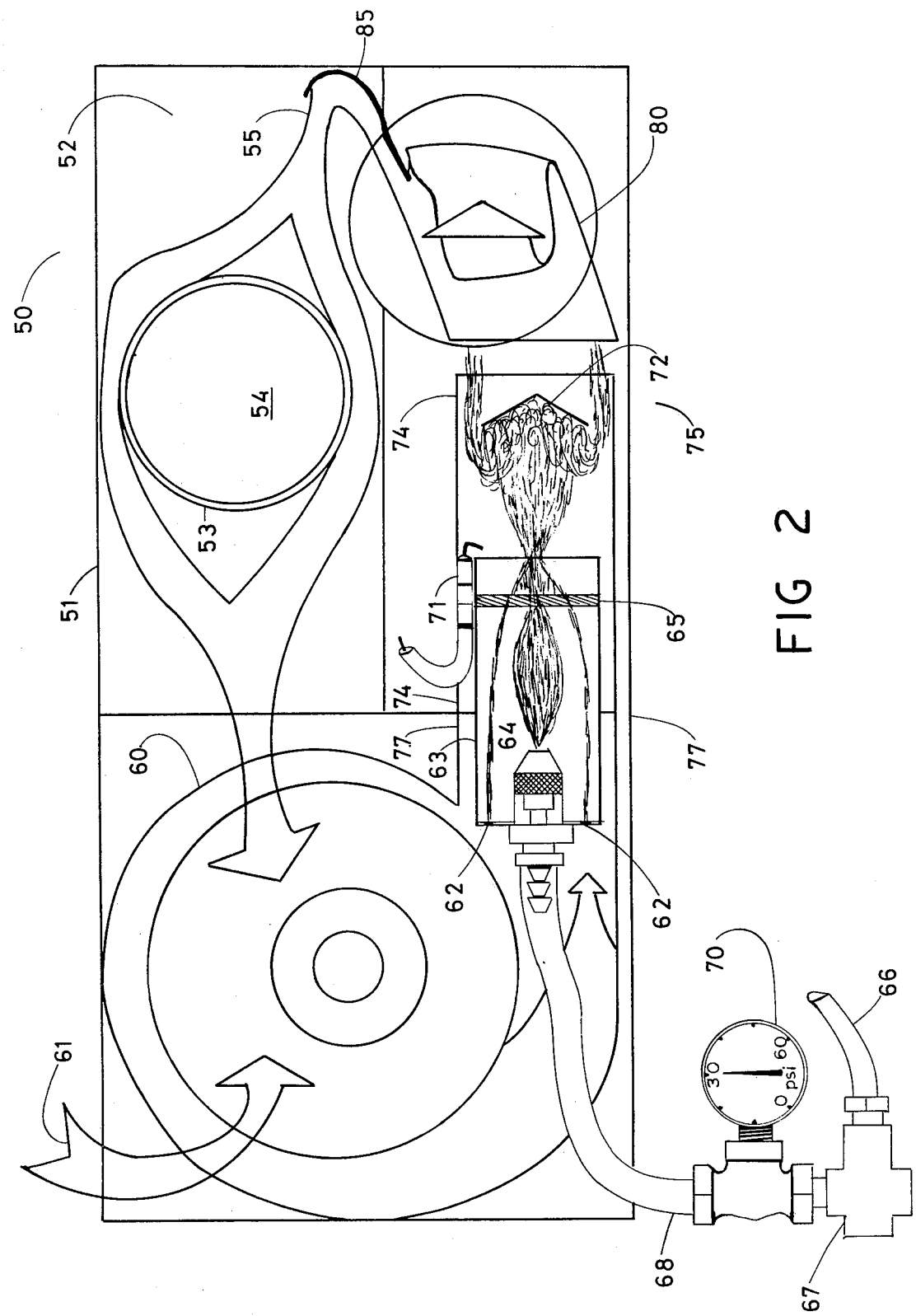
FIG. 2 is a diagrammatic plan view of the engine preheater, partially cut away, to show the operation of the preheater device.

A more detailed picture and implementation of the preferred embodiment is illustrated and described with reference to FIGS. 2 and 3. As shown in these figures, the engine preheating unit 50 is housed entirely within carrying case or box 51. The warming receptacle 52 includes receiving hole 53 for supporting a fuel cylinder or canister 54 and defines an enclosure around the base portion of the cylinder for warming it with a minor portion of hot exhaust air as heretofore described. This flow of warming air is designated 55 and is drawn through the warming receptacle by the blower 60. However, most of the air drawn in by the blower for delivery is environmental air 61.

Air delivered under pressure by the blower passes through annular slit or ring of holes 62 into the mixing chamber 63 in a cylindrical stream axially around the 80 degree nozzle 64 which delivers fuel gas under pressure in a cone directed outwardly into the co-axial stream of air to initiate mixing. Mixing is enhanced by stationary turbine 65 mounted in the mixing chamber to provide mixing vanes.

Gas vaporized from the cylinder 54 passes through the manual valve and line 66 to regulator 67, regulating the fuel pressure in line 68 as indicated by gauge 70 for delivery through nozzle 64 into the mixing chamber. Intermixed fuel and air emerging from the mixing vanes 65 and mixing chamber 63 is ignited by solid state ignitor electrode 71. The stream of burning fuel air mixture runs head on into the retroreflecting or reversing cone 72 which turns the flame back on itself for secondary burning. This complete combustion is facilitated by additional air travelling down the blower shroud 74 outside the mixing chamber 63. This entire assembly of the nozzle 64, mixing chamber 63, mixing vanes 65, ignitor 71, reflecting surface 72 and enclosing shroud portion 74 is referred to herein and in the claims as the fuel and air mixing combustion chamber 75 or simply the combustion chamber.

Figure 3:
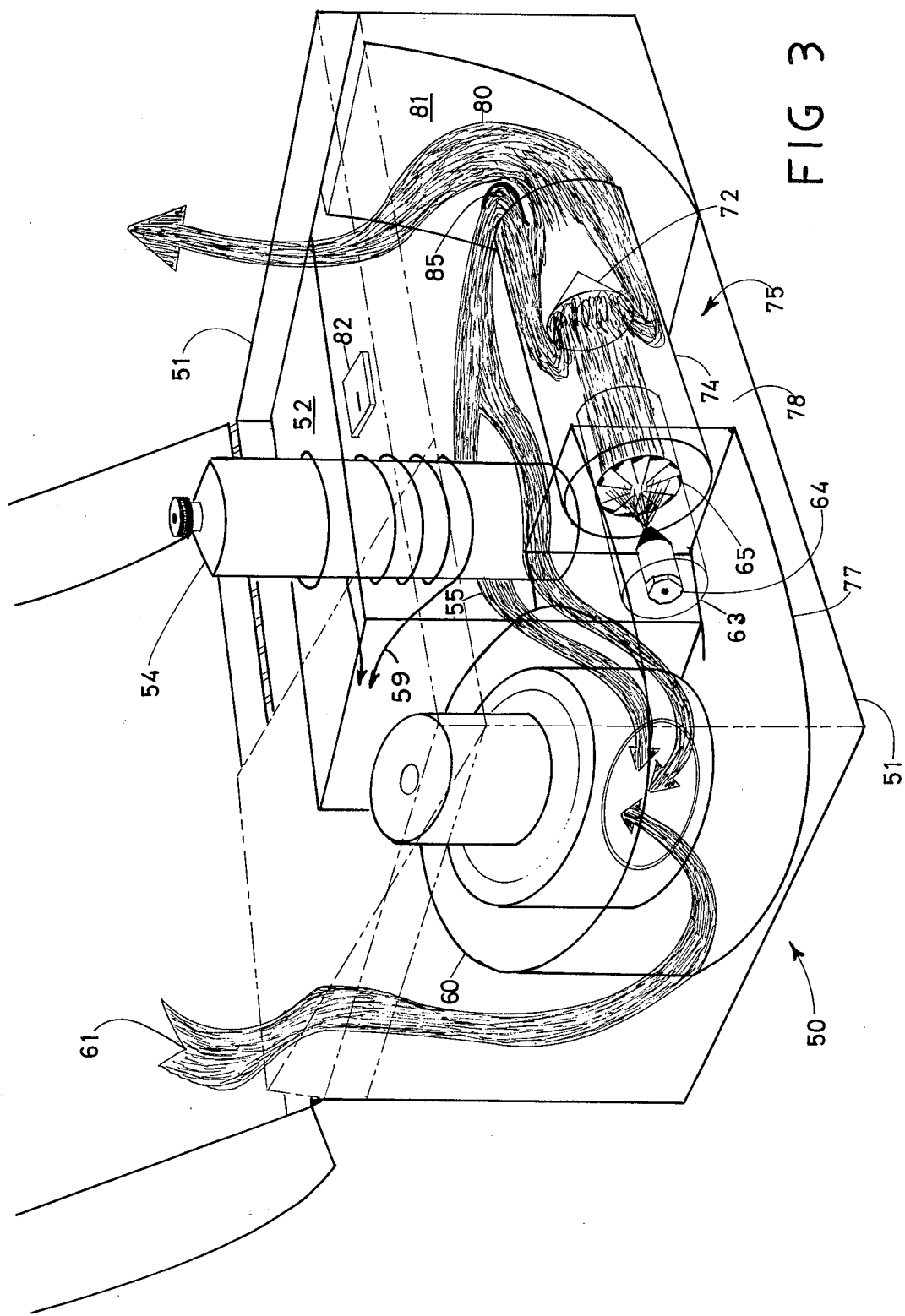
FIG. 3 is a phantom perspective view further illustrating the operation of the invention and the arrangement of the elements of the preheater in the carrying case according to the preferred embodiment.

The housing arrangement of the elements or components of the portable engine preheater is shown more clearly in FIG. 3 and it is important to note that the combustion chamber enclosing shroud 74 is of smaller diameter than the blower outlet shroud 77. By this expedient, the blower is able to deliver a first stream of air into the combustion chamber (both in and around the mixing chamber 63) and a second stream of air outside the combustion chamber 75 between the combustion chamber shroud 74 and the carrying case housing 51, in order to cool the housing for safe handling and storage. To this end, the blower 60 is mounted directly to the housing 51 while the elements of the combustion chamber 75 including all the components described above are coupled to the blower and spaced from the housing to define the cooling space 78 between the housing and the combustion chamber components. The engine preheater can therefore be housed in a small space while not overheating the carrying case housing.

Finally, referring to the output of the engine preheater 50 described with reference to FIGS. 2 and 3, the hot exhaust air passes around the reflector cone into the delivery duct 81 where a hose is connected to feed hot exhaust air into the engine to be preheated. A temperature sensor 82 may be provided to indicate the temperature of the heated air in the delivery duct. In addition, a deflector 85 in the duct diverts a minor portion of the hot exhaust air into the warming receptacle 52 amounting to 5-10% of the total hot exhaust to form the warming stream 55 for warming the fuel cylinder and preventing it from freezing up as a result of rapid vaporization and rapid withdrawal of fuel.

Figure 4:
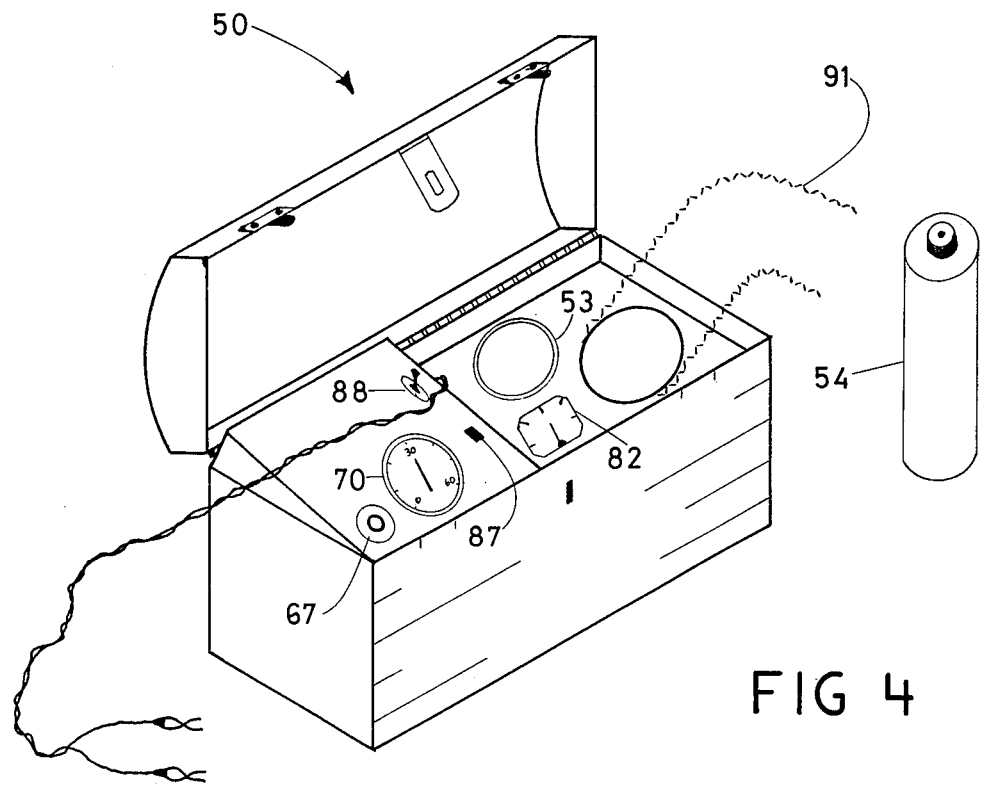
FIG. 4 is a plan view of the preheater housed in the carrying case or box as seen by the operator of the device.
Figure 5:
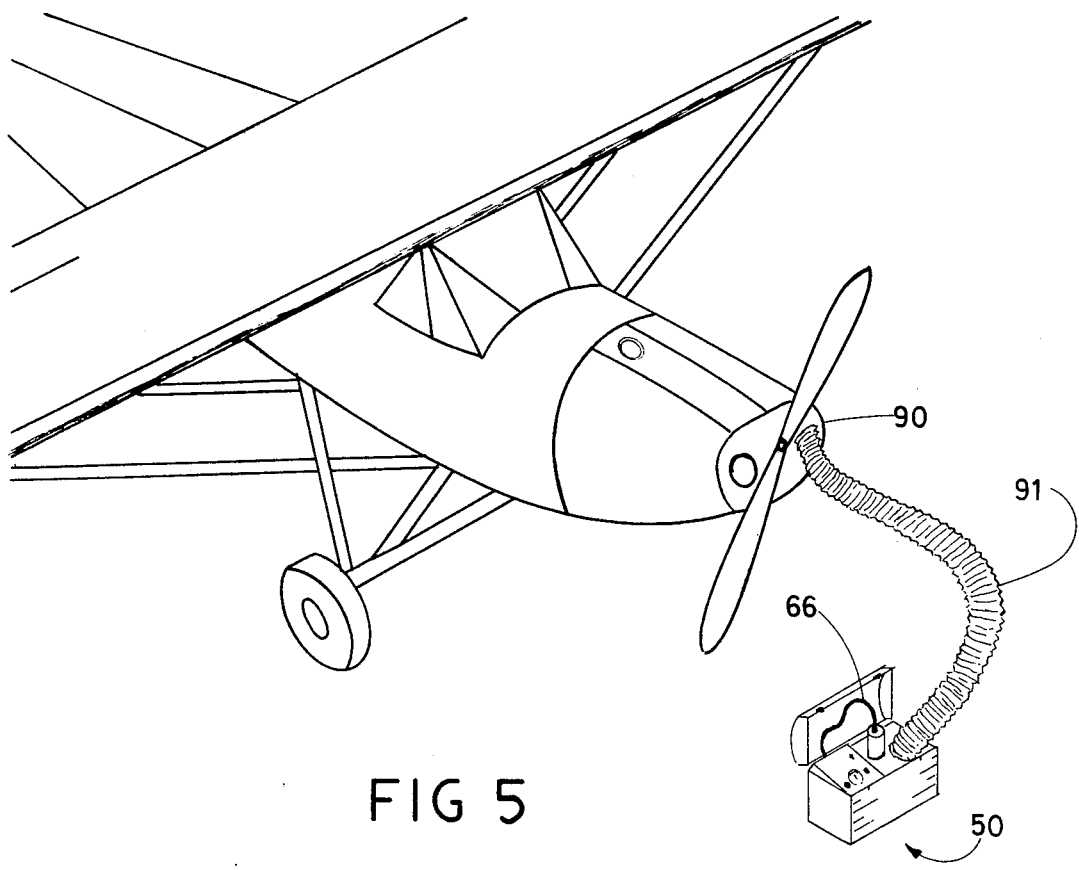
FIG. 5 is a perspective view of the preheater in operation supplying "preheat" to an aircraft engine prior to start up.

A plan view of the assembled engine preheater in its portable carrying case is illustrated in FIG. 4 with the components described above with reference to FIGS. 2 and 3 similarly numbered. Also apparent on the face of the panel is the push button 87 for the solid state igniter and the switch 88 for blower 60. The operation of the engine preheater is illustrated with reference to FIG. 5. In operating the system a DC power source is attached for the blower motor and the voltage selector switch set to the correct position. A flexible hose piece 91 is connected between the preheater 50 and the aircraft engine 90. The carrying case cover is lifted up and a cylinder is placed in the warming receptacle where it must remain during operation. The fuel gas hoses are appropriately connected. The blower switch is turned on first as the preheater is never to be operated without the blower operating. The gas valve is opened and the regulator set for 30 pounds. It should not be operated over 50 P.S.I. for any extended period of time. Then the ignitor button is pushed to spark the solid state ignitor. If the burner is not heard to start, the ignitor switch is pushed two or three more times. The gas should not be left on for more than 10 seconds without the unit starting. In shutting down the preheater, the gas is first turned off. The operator then waits for the unit to stop firing and for the pressure gauge to return to zero. Then the blower is shut off and the unit repacked.

While the invention has been described with reference to its use with small gas cylinders and canisters of the disposable type, it can also be used with large gas cylinders of the type which can deliver rapid vaporization of fuel without too rapid a drop in temperature. In that event, the air and fuel mixing and combustion chamber elements of the present invention still afford efficient utilization of the fuel and prolonged and effective burning and delivery of hot exhaust air for preheating purposes.

Furthermore, for application of the invention with small fuel gas cylinders of the disposable type, heating of at least a portion of the fuel cylinder to maintain the fuel in the cylinder at a sufficient temperature for rapid vaporization and delivery of fuel from the cylinder according to the present invention may be accomplished by electrical heating element means applied to the fuel cylinder or warming receptacle, drawing upon, for example, a storage battery source of electricity, instead of or in addition to using feedback of hot exhaust air as described in the foregoing examples. Thus, a supplemental heating element 59 is shown in FIG. 3 positioned within the warming receptacle 52 and around a portion of the fuel cylinder 54 contained within the receptacle. The heating element is powered for example, by the storage battery of an engine to be preheated, and can be used as a fuel cylinder heating means during start-up, as a supplemental source of fuel cylinder heating, or as a substitute source of heat. Thermostatic control or other control of the heating element may also be used.

We claim:

1. In a portable preheater of the type for burning a fuel and air mixture generated from a small pressurized fuel gas cylinder and blower and for delivering hot exhaust air through hot exhaust delivery duct means for preheating, the improvement comprising:
    warming receptacle means for supporting the fuel gas cylinder and defining a substantially enclosed pathway around at least a portion of a cylinder supported in the receptacle and for receiving and conducting a minor portion of the hot exhaust air from the hot exhaust delivery duct means for warming the fuel gas cylinder; and means for diverting and feeding back a minor portion of the hot exhaust air from the hot exhaust delivery duct means into the warming receptacle means whereby the fuel gas cylinder is maintained at a sufficient temperature to permit continuous vaporization of the fuel at a desired rate.

2. An improved fuel burner for portable heaters using a pressurized gas cylinder comprising:
    nozzle means and nozzle feed means for generating a stream of vaporized or fragmented fuel gas from the pressurized gas cylinder;
    blower means mounted upstream from the nozzle means for generating an airflow;
    shroud means mounted co-axially around said nozzle means and operatively coupled to the blower means for delivering a flow of mixing air around the nozzle and fuel gas stream;
    said nozzle means comprising an outwardly angled annular ring nozzle for diverting the stream of fuel gas outwardly into the surrounding flow of air generated by the blower means;
    mixing vane means interposed in the air and fuel gas stream path for introducing turbulence and enhancing mixture of air and fuel;
    means for igniting the air and fuel gas mixture downstream from the mixing means;
    and means for enhancing secondary burning and complete combustion of the fuel and air mixture comprising concave deflector means mounted in the path of the ignited mixture having a concavity facing upstream into the ignited mixture for turning the flame back upon itself.

3. A fuel burner as set forth in claim 2 wherein said mixing vane comprises a stationary turbine wheel for circularly diverting and mixing the air flow and fuel gas stream.

4. A fuel burner as set forth in claim 2 wherein the means for enhancing secondary burning comprises a hollow cone reflector mounted in the path of the ignited air and fuel gas mixture with the point oriented downstream for turning the flame back upon itself.

5. In a portable preheater of the type including means for generating and combusting a fuel and air mixture flow from a pressurized gas cylinder and blower and for delivering hot exhaust air for preheating, the improvement in the fuel gas and air mixture flow generating and combusting means comprising:
    mixing means interposed in the air and fuel gas flow path comprising a radial array of slanted mixing vanes for circularly diverting and mixing the air and fuel gas;
    means for igniting the air and fuel gas mixture downstream from the mixing means;
    and means for enhancing secondary burning and complete combustion of the fuel and air mixture comprising hollow conical reflector means mounted in the path of the ignited mixture and oriented for turning the flame back upon itself.

6. In a portable preheater of the type including means for generating and combusting a fuel gas and air mixture from a pressurized gas cylinder and blower means, and for delivering hot exhaust air for preheating, said portable preheater mounted in a carrying case the improvement comprising:
    said blower mounted directly to the carrying case, said means for generating and combusting a fuel gas and air mixture mounted to the blower and spaced from the walls of the carrying case, said blower including shroud means for delivering a first flow of air into the fuel and air mixture generating and combusting means and for delivering a second flow of air around said generating and combusting means for cooling the carrying case and maintaining the case at a temperature so that it can be handled and stored safely.

7. A portable preheater as set forth in claim 6 wherein said carrying case includes a built in warming receptacle means for receiving and supporting a fuel gas cylinder, said receptacle formed with walls enclosing at least a portion of the fuel cylinder placed in the warming receptacle, said receptacle formed with an inlet and an outlet; means for deflecting and delivering a minor portion of hot exhaust air to the warming receptacle inlet for warming a fuel cylinder supported in the receptacle; said blower coupled to the warming receptacle outlet for drawing the flow of warming air around the cylinder, whereby the cylinder is maintained at a temperature sufficient to permit continuous vaporization of the fuel gas at the desired rate.

8. A new and improved portable self-contained engine preheater for burning gas fuel from a small pressurized cannister and delivering hot air comprising:
    nozzle and nozzle feed means for generating a stream of vaporized or fragmented fuel gas from a pressurized fuel cannister;
    blower and shroud means for delivering a flow of air around the nozzle and fuel gas stream;
    mixing vane means interposed in the air and fuel gas path for introducing turbulence and enhancing the mixture of air and fuel;
    means for igniting the fuel air mixture;
    means for enhancing secondary burning and complete combustion of the fuel and air mixture comprising retroreflector means mounted in the path of the ignited mixture for turning the flame back upon itself;

duct means for venting a major portion of the hot exhaust air for engine preheating or other heating purposes;

means for deflection and feedback of a minor portion of the hot exhaust air for warming a fuel gas cannister used to fuel the engine preheater;

and warming receptacle means for supporting a fuel gas cannister for defining a substantially enclosed pathway around at least a portion of a cannister supported in the receptacle, and for receiving and conducting the minor portion of the hot exhaust air deflected and fed back for warming the fuel gas cannister whereby the fuel gas cannister is maintained at a sufficient temperature to permit continuous vaporization of the fuel at a desired rate.

9. A new and improved heater as set forth in claim 8 wherein said nozzle comprises an angled annular nozzle for generating an annular stream of fuel gas in a cone directed outwardly from the directional axis of flow whereby the fuel gas stream encounters and mixes with the flow of air directed around the nozzle and fuel stream.

10. A new and improved heater as set forth in claim 8 wherein the mixing vane means comprises stationary radial turbine vanes for circularly diverting and mixing the air and fuel.

11. A new and improved heater as set forth in claim 8 wherein said means for igniting the fuel comprises a solid state igniter.

12. A new and improved heater as set forth in claim 8 wherein said deflector means mounted in the path of the ignited mixture comprises a hollow conical shaped reflector with the point directed downstream in the ignited air and fuel mixture flow.

13. A new and improved heater as set forth in claim 8 wherein said blower is formed with a first inlet for drawing in environmental air and a second inlet coupled to the warming receptacle outlet for drawing warm air through the warming receptacle.

14. A new and improved heater as set forth in claim 8 wherein the engine preheater is portably mounted in a carrying box, said blower is mounted directly to the box, said nozzle means, mixing vane means, igniting means, and deflector means are mounted to the blower and spaced from the walls of the carrying box to define a cooling space from the walls of the carrying box, said blower and shroud means also formed to deliver a flow of air in the cooling space means for cooling the carrying box and maintaining the box at a temperature so that it can be handled and stored safely.

15. A new and improved heater using fuel of the small cannister gas cylinder type for delivering hot air comprising:

warming receptacle means for receiving and supporting a fuel gas cylinder said receptacle formed with walls enclosing at least a base portion of the fuel cylinder and defining a space between the receptacle walls and a fuel cylinder supported in the receptacle, said receptacle formed with an inlet and an outlet for passage of warming air through the space around the cylinder;

nozzle means for delivering a stream of fuel vapor or fragmented fuel under pressure;

blower means for delivering flow of air under pressure around said nozzle and fuel stream;

mixing vane means interposed in the flow of air and fuel stream for introducing turbulence and enhancing the mix of fuel and air;

igniter means for igniting the air and fuel mixture emerging from the mixing vanes;

reflecting means interposed in the exhaust path of the air and fuel gas flame for reversing ignited gas flow back on itself to enhance secondary burning and complete combustion of the fuel/air mixture;

hot exhaust delivery duct means for conducting and delivering the major portion of heated exhaust air for heating purposes; and means for deflecting and feeding back a minor portion of hot exhaust air from the delivery duct means to the warming receptacle inlet for warming a fuel cylinder supported in the receptacle;

said blower means coupled in part to the warming receptacle outlet for enhancing the flow of warming air around the cylinder, whereby the cylinder is maintained at temperature sufficient to permit continuous vaporization of the fuel gas at the desired rate.

16. A new and improved portable engine preheater for generating and burning a fuel and air mixture from fuel gas stored under pressure in small cannisters or cylinders of the disposable type and for delivering hot exhaust air for preheating comprising:

warming receptacle means for receiving and supporting a fuel gas cylinder said receptacle formed with walls enclosing at least a base portion of the fuel cylinder and defining a space between receptacle walls and a fuel gas cylinder supported in the receptacle, said receptacle formed with an inlet and an outlet for passage of warming air through the space around the cylinder;

nozzle means for delivering a stream of fuel vapor or fragmented fuel, said nozzle formed with an angled annular outlet for generating an annular stream of fuel gas in a cone directed outwardly from the direction of axial flow;

blower and shroud means for delivering a first flow of air under pressure around said nozzle and fuel stream whereby the outwardly directed cone of fuel from the nozzle encounters and mixes with the flow of air directed around the nozzle and fuel stream;

mixing means interposed in the flow of air and fuel comprising stationary radial turbine vanes for introducing turbulence and circularly diverting and enhancing the mixture of fuel and air;

igniter means for igniting the air and fuel mixture emerging from the mixing means;

reflecting means interposed in the path of the ignited fuel and air mixture comprising a surface concavity facing upstream from reversing ignited fuel gas and air flow back on itself to enhance secondary burning and complete combustion of the fuel and air mixture and form the hot exhaust air;

duct means for conducting and delivering the major portion of heated exhaust air for engine preheating;

means for deflecting and delivering a minor portion of hot exhaust air to the warming receptacle inlet for warming a fuel cylinder supported in the receptacle;

said blower means coupled in part to the warming receptacle outlet for enhancing the flow of warming air around the cylinder, whereby the cylinder is maintained at temperature sufficient to permit continuous vaporization of the fuel gas at the desired rate;

and a portable carrying case housing the said foregoing engine preheater components wherein said blower means is coupled directly to the wall of the carrying case, said nozzle means, mixing vane means, igniter means and reflecting means are coupled to the blower and spaced from the walls of the carrying case to define a cooling space between the hot combustion components and the walls of the carrying case, said blower and shroud means also formed to deliver a second flow of air in the cooling space for cooling the carrying case and maintaining the case housing at a temperature so that it can be handled and stored safely.

17. A new and improved engine preheater and preheater for other uses, using fuel of the gas cylinder type for delivering hot air comprising:

warming receptacle means for receiving and supporting a fuel gas cylinder, said receptacle including heating means for heating at least a portion of the fuel cylinder to maintain fuel in the cylinder at a temperature for rapid vaporization and delivery of fuel from the cylinder;

nozzle means for delivering a stream of fuel vapor or fragmented fuel under pressure;

blower means for delivering flow of air under pressure around said nozzle and fuel stream;

mixing vane means interposed in the flow of air and fuel stream for introducing turbulence and enhancing the mix of fuel and air;

igniter means for igniting the air and fuel mixture emerging from the mixing vanes;

reflecting means interposed in the exhaust path of the air and fuel gas flame for reversing ignited gas flow back on itself to enhance secondary burning and complete combustion of the fuel-air mixture; and duct means for conducting and delivering the major portion of heated exhaust air for engine preheating;

said warming receptacle heating means including the combination of means for diverting and feeding back a portion of the hot exhaust from the hot exhaust delivery duct means into the warming receptacle means and electrical heating element means in operative relationship with the warming receptacle means.

18. In an engine preheater or preheater for other uses, using fuel of the gas cylinder type for delivering hot air, the improvement comprising:

warming receptacle means for receiving and supporting a fuel gas cylinder said receptacle including means for heating at least a portion of the fuel cylinder to maintain fuel in the cylinder at a sufficient temperature for rapid vaporization and delivery of fuel from the cylinder, said heating means including electrical heating element means.

* * * * *